United States Patent
Kobayashi

(10) Patent No.: US 12,092,199 B2
(45) Date of Patent: Sep. 17, 2024

(54) POWDER LUBRICATION METHOD OF STRAIN WAVE GEARING

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 17/998,573

(22) PCT Filed: Aug. 24, 2021

(86) PCT No.: PCT/JP2021/031053
§ 371 (c)(1),
(2) Date: Nov. 11, 2022

(87) PCT Pub. No.: WO2023/026376
PCT Pub. Date: Mar. 2, 2023

(65) Prior Publication Data
US 2024/0229918 A1     Jul. 11, 2024

(51) Int. Cl.
*F16H 57/04*     (2010.01)
*F16H 49/00*     (2006.01)

(52) U.S. Cl.
CPC ......... *F16H 57/041* (2013.01); *F16H 49/001* (2013.01); *F16H 57/048* (2013.01)

(58) Field of Classification Search
CPC ........ F16H 57/041; F16H 49/001; B22F 3/02; B22F 2003/023
See application file for complete search history.

(56) References Cited

U.S. PATENT DOCUMENTS

| | | | |
|---|---|---|---|
| 2005/0044987 A1* | 3/2005 | Takayama | B22F 7/04 419/14 |
| 2017/0254404 A1* | 9/2017 | Kobayashi | F16H 49/001 |
| 2017/0370457 A1 | 12/2017 | Kobayashi | |

FOREIGN PATENT DOCUMENTS

| | | |
|---|---|---|
| JP | 611436 Y2 | 3/1994 |
| JP | 2006138773 A | 6/2006 |

(Continued)

OTHER PUBLICATIONS

International Search Report (PCT/ISA/210) and Written Opinion (PCT/ISA/237) mailed on Nov. 2, 2021, by the Japanese Patent Office as the International Searching Authority for International Application No. PCT/JP2021/031053.

*Primary Examiner* — Jake Cook
(74) *Attorney, Agent, or Firm* — BUCHANAN INGERSOLL & ROONEY PC

(57) ABSTRACT

A powder supply mechanism, which is provided with a press-molded article obtained by consolidating a solid lubricant powder in advance, is incorporated into an inner-side space of an externally toothed gear of a strain wave gearing. While the strain wave gearing is operating, the press-molded article is worn down by the friction plate, whereby the powder supply mechanism can incrementally supply very small amounts of a solid lubricant abrasion powder from the press-molded article over an extended period. It is possible to suppress any reduction in efficiency caused by loss torque produced due to a large amount of the solid lubricant powder infiltrating gaps in, inter alia, a contact section of a wave generator rotating at high speed. Thus, it is possible to extend the service life of the powder-lubricated strain wave gearing while keeping the efficiency consistently high.

11 Claims, 2 Drawing Sheets

(56) References Cited

FOREIGN PATENT DOCUMENTS

| | | |
|---|---|---|
| JP | 2013079715 A | 5/2013 |
| JP | 6261773 B2 | 12/2017 |
| WO | 2016084235 A1 | 6/2016 |
| WO | 2016113847 A1 | 7/2016 |

* cited by examiner

INITIAL STATE ← | → FINAL STATE

INITIAL STATE ← → FINAL STATE

POWDER LUBRICATION METHOD OF STRAIN WAVE GEARING

TECHNICAL FIELD

The present invention relates to a strain wave gearing, and particularly relates to a powder lubrication method of a strain wave gearing in which contact surfaces, etc., are lubricated using a solid lubricant powder.

BACKGROUND ART

The inventor proposed, in Patent Documents 1 and 2, powder lubrication methods in which member contact surfaces, etc., in a strain wave gearing are lubricated using a fine powder of a solid lubricant that are filled into the strain wave gearing or is sealed therein. In the strain wave gearing disclosed in Patent Document 1, a fine powder of an ionically bonded compound having a layered structure is filled into an interior space in an externally toothed gear as a solid lubricant. While the strain wave gearing is operating, the fine powder filled into the interior space is crushed between contact surfaces to be lubricated, adhering to both contact surfaces and forming a thin surface film, which is rolled thinner and further comminuted, changing to a form that readily infiltrates the contact surfaces. Lubrication is maintained by the thin surface film formed on the contact surfaces and by the fine powder that has changed in form. Because the adhering thin surface film and the rolled and comminuted fine powder are not viscous, loss in power caused by viscosity resistance does not occur, and it is possible to realize high-efficiency operation at low load and with high-speed rotation. In the strain wave gearing disclosed in Patent Document 2, there is provided a mechanism for efficiently guiding a fine powder of a solid lubricant that is filled into an externally toothed gear or is sealed therein to sites to be lubricated.

PRIOR-ART LITERATURE

Patent Literature

Patent Literature 1: WO 2016/084235
Patent Literature 2: WO 2016/113847

DISCLOSURE OF THE INVENTION

Problems to be Solved by the Invention

According to investigations conducted by the inventor et al, the durability of a strain wave gearing lubricated using a fine powder of a solid lubricant is greatly influenced by the amount of fine powder filled thereinto, and it has been established that service life decreases if a suitable filling amount is not ensured.

However, when a fine powder of a solid lubricant having a layered structure is used, a temporary reduction in efficiency occurs due to loss torque produced when the fine powder is guided into gaps between contact surfaces by cleavage force, rolled thinner, and further comminuted. The degree and incidence of the reduction in efficiency is affected by a variety of factors, such as the atmosphere while the strain wave gearing is operating, the characteristics (load-bearing capacity, friction coefficient, cohesion, etc.) of the fine powder being used, the filling amount, and the particle size. In particular, when a large amount of the fine powder is supplied into gaps between contact surfaces of a wave generator that rotates at high speed, the reduction in efficiency caused by loss torque is considerable, and stable operation of the strain wave gearing is hindered.

It is an object of the present invention to propose a powder lubrication method of a strain wave gearing, the method making it possible to continuously supply a suitable amount of a solid lubricant powder to sites to be lubricated, such as contact surfaces of a wave generator, in order to suppress any reduction in efficiency caused by loss torque produced due to a large amount of the powder being supplied to the sites to be lubricated.

It is additionally an object of the present invention to provide a strain wave gearing in which it is possible to continuously supply a suitable amount of a solid lubricant powder to sites to be lubricated in order to suppress any reduction in efficiency caused by loss torque produced due to a large amount of the powder being supplied to the sites to be lubricated.

Means Used to Solve the Above-Mentioned Problems

The powder lubrication method of a strain wave gearing according to the present invention is characterized by:
disposing a press-molded article of a solid lubricant powder inside a strain wave gearing;
making a friction plate to bring into frictional contact with the press-molded article to produce a solid lubricant abrasion powder while the strain wave gearing is operating; and
using the produced solid lubricant abrasion powder to lubricate sites to be lubricated in the strain wave gearing.

Additionally, the strain wave gearing according to the present invention is characterized by having
a rigid internally toothed gear,
a flexible externally toothed gear disposed inside the internally toothed gear,
a wave generator disposed inside the externally toothed gear, and
a powder supply mechanism disposed inside the externally toothed gear,
the powder supply mechanism being provided with
a press-molded article of a solid lubricant powder,
a friction plate that comes into frictional contact with the press-molded article to produce a solid lubricant abrasion powder, and
a pressing member for pressing the friction plate against the press-molded article and maintaining the state in which these two elements are in frictional contact.

It is possible to use molybdenum disulfide ($MoS_2$), tungsten disulfide ($WS_2$), graphite, carbon nanotubes (CNT), onion-like carbon (OLC), etc., as the solid lubricant powder.

When the strain wave gearing is used as a gear reducer, the wave generator serves as a rotation-inputting member, and the externally toothed gear serves as a secured member or a reduced-rotation-outputting member. In this case, the friction plate is disposed on one element from among the wave generator and the externally toothed gear, and the press-molded article is disposed on the other of these elements. Additionally, at least one component from among the friction plate and the press-molded article is pressed against the other of these components using a spring member.

In the present invention, it is desirable for the press-molded article of the solid lubricant powder to be a lightly press-molded article having a compacting density of no more than 50% of the true density. It is also desirable for the press-molded article to be of a simple form, e.g., cylindrical or annular.

In the present invention, it is possible to use steel, stainless steel, a copper alloy, an aluminum alloy, or a ceramic as the material of the friction plate, said material having a hardness of Hv 60 or greater, or a Mohs hardness of 2 or greater. It is desirable for the material of the friction plate to be one to which the solid lubricant powder does not readily adhere. It is desirable for the surface roughness of a friction surface of the friction plate to be 12S or less, and the friction surface may be finely shaped through surface texturing.

Effect of the Invention

In the present invention, in lieu of filling the interior of a strain wave gearing with a fine powder of a solid lubricant, a press-molded article obtained by consolidating a solid lubricant powder in advance is disposed in the strain wave gearing. While the strain wave gearing is operating, the press-molded article is worn down, whereby a solid lubricant abrasion powder can be stably and incrementally supplied in very small amounts over an extended period. This makes it possible to minimize the degree and incidence of a reduction in efficiency caused by loss torque produced due to a large amount of the solid lubricant powder being supplied into gaps between contact surfaces to be lubricated, and makes it possible to extend the service life of the strain wave gearing while keeping the efficiency consistently high.

MODE FOR CARRYING OUT THE INVENTION

Embodiments of a strain wave gearing to which the present invention is applied are described below with reference to the drawings. The embodiments below illustrate examples of the present invention, but in no way limit the present invention to these embodiments.

Embodiment 1

Figure 1A:
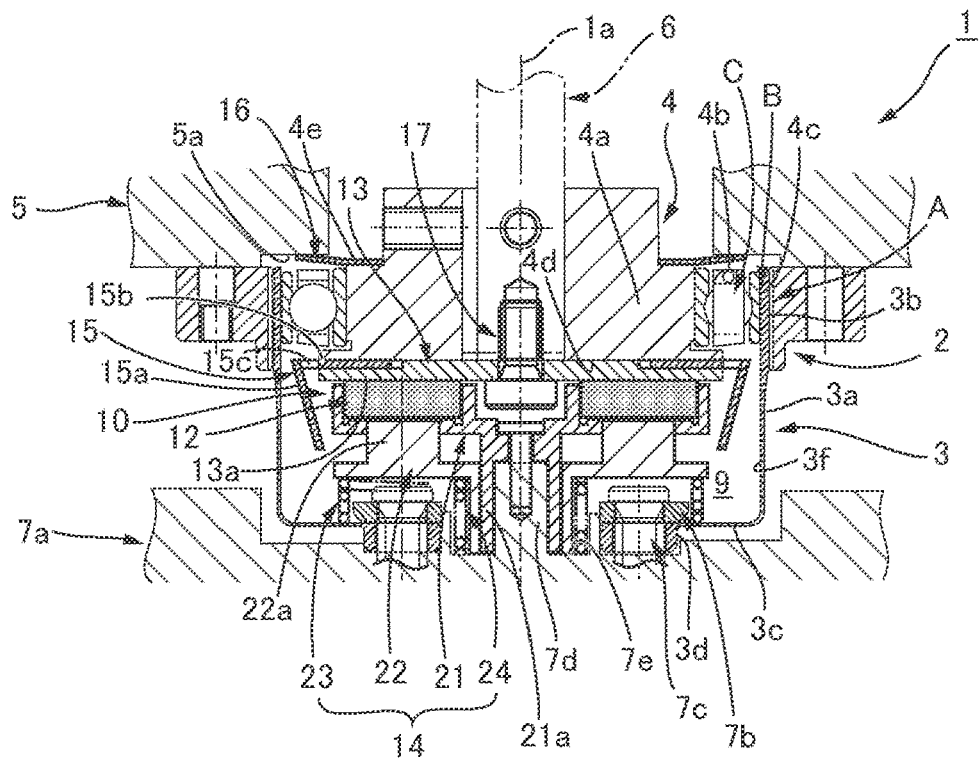
FIG. 1A is a schematic longitudinal cross-sectional diagram showing one example of a strain wave gearing to which the present invention is applied.

FIG. 1A is a schematic longitudinal cross-sectional diagram showing one example of a strain wave gearing to which the present invention is applied. The strain wave gearing 1 is of a type referred to as cup-shaped and is provided with an annular rigid internally toothed gear 2, a cup-shaped flexible externally toothed gear 3, and an elliptically contoured wave generator 4. The externally toothed gear 3 is disposed coaxially inside the internally toothed gear 2. The strain wave gearing 1 is installed in a plumb-vertical orientation in which the axis 1a thereof is oriented in the plumb-vertical direction and the wave generator 4 is positioned on the upper side.

The externally toothed gear 3 is provided with a cylindrical barrel part 3a capable of flexing in the radial direction. External teeth 3b are formed on an outer peripheral surface portion at an open-end side of the cylindrical barrel part 3a. A diaphragm 3c extending radially inward from the opposite-side end of the cylindrical barrel part 3a is formed in the externally toothed gear 3. An annular rigid boss 3d is formed on the inner peripheral edge of the diaphragm 3c. The boss 3d is interposed between an annular pressing member 7b and an output shaft 7a, these three members being securely fastened in a coaxial manner in this state by a plurality of fastening bolts 7c.

The wave generator 4 is provided with a rigid wave plug 4a and a wave bearing 4b (wave generator bearing) mounted on the outer peripheral surface of the ellipsoidal contour of the wave plug 4a. The wave generator 4 is mounted on the inner side of the portion of the externally toothed gear 3 at which the external teeth 3b of the cylindrical barrel part 3a are formed.

In the present example, the strain wave gearing 1 is used as a gear reducer. For example, the internally toothed gear 2 is secured to a device housing 5 that is a secured-side member positioned on the upper side, the wave generator 4 is securely fastened to an input shaft 6 or another motor rotating shaft positioned on the upper side, and the externally toothed gear 3 is securely fastened in a coaxial manner to an output shaft 7a positioned on the lower side. High-speed rotation inputted to the wave generator 4 is greatly reduced via the internally toothed gear 2 and the externally toothed gear 3, and reduced rotation is outputted from the externally toothed gear 3 via the output shaft 7a.

A powder supply mechanism 10 is incorporated into an inner-side space 9 formed between the diaphragm 3c and the wave generator 4 inside the cylindrical barrel part 3a of the externally toothed gear 3. A solid lubricant abrasion powder supplied from the powder supply mechanism 10 is supplied to sites to be lubricated inside the strain wave gearing 1, whereby these sites to be lubricated are lubricated.

The main sites to be lubricated in the strain wave gearing 1 include a contact section (toothed section) A between the internally toothed gear 2 and the externally toothed gear 3, a contact section B between an inner peripheral surface 3f of the cylindrical barrel part 3a of the externally toothed gear 3 and an outer peripheral surface 4c of the wave generator 4, and a contact section C in the interior of the wave generator 4. The contact section C in the interior of the wave generator 4 is, inter alia, a contact portion between the wave plug 4a and the wave bearing 4b, or a contact portion between constituent components (inner race, outer race, and balls) of the wave bearing 4b. The contact surfaces (inner peripheral surface 3f and outer peripheral surface 4c) in the contact section B and the contact surfaces in the contact section C in the interior of the wave generator 4 communicate with the inner-side space 9 in the externally toothed gear 3. The contact surfaces in these contact sections B, C are lubricated by the solid lubricant abrasion powder 11 supplied from the powder supply mechanism 10. The contact section (toothed section) A also is lubricated by the solid lubricant abrasion powder 11, which moves around the contact section A by way of the contact sections B, C.

The powder supply mechanism 10 is provided with an press-molded article 12 made from a solid lubricant powder, a friction plate 13 that comes into frictional contact with the press-molded article 12 to produce the solid lubricant abrasion powder 11, and a molded-article-pressing part 14 for pressing the press-molded article 12 and the friction plate 13 relatively against each other and maintaining the state in which these two elements are in frictional contact. The powder supply mechanism 10 is also provided with a first guide plate 15 for agitating the solid lubricant abrasion powder 11 produced from the press-molded article 12 and guiding the solid lubricant abrasion powder 11 toward the contact sections B, C at the sites to be lubricated, and a second guide plate 16 for guiding the solid lubricant abrasion powder 11 that passes through the contact sections B, C toward the contact section A.

More specifically, the discoid friction plate 13 is coaxially secured to a plug inner-side end surface 4d in the wave plug 4a of the wave generator 4, the plug inner-side end surface 4d facing the inner-side space 9. In the present example, the friction plate 13 is secured by bolts 17 for securely fastening the wave plug 4a to the input shaft 6. The end surface of the friction plate 13 that faces the inner-side space 9 serves as a friction surface 13a. The press-molded article 12 of the solid lubricant powder, which is molded in the shape of a ring of fixed thickness, is disposed in a coaxial state on the lower side of the friction surface 13a. In the present example, the press-molded article 12 is pressed against the friction surface 13a along the direction of the axis 1a by the molded-article-pressing part 14.

The molded-article-pressing part 14 is provided with a molded-article-retaining member 21 for retaining the press-molded article 12 in a state enabling movement in directions toward and away from the friction surface 13a, a molded-article-pressing plate 22 for pressing the press-molded article 12 retained by the molded-article-retaining member 21 against the friction surface 13a, and a large-diameter outer-side helical spring 23 and a small-diameter inner-side helical spring 24 for pressing the press-molded article 12 against the friction surface 13a via the molded-article-pressing plate 22.

The molded-article-retaining member 21 is coaxially secured to a central shaft part 7d of the output shaft 7a, which extends into the inner-side space 9 through a central opening section in the boss 3d of the externally toothed gear 3. The molded-article-pressing plate 22 is disposed below the molded-article-retaining member 21 and is provided with an annular protrusion 22a for pressing the press-molded article 12 retained by the molded-article-retaining member 21 against the friction surface 13a. Additionally, the molded-article-pressing plate 22 is supported, by a cylindrical shaft part 21a formed in a central section of the molded-article-retaining member 21, in a state enabling sliding in the direction of the axis 1a. The slidable molded-article-pressing plate 22 is pressed toward the friction surface 13a by the large-diameter outer-side helical spring 23 and the small-diameter inner-side helical spring 24. The outer-side helical spring 23 is disposed in a compressed state between the molded-article-pressing plate 22 and the diaphragm 3c of the externally toothed gear 3, and the inner-side helical spring 24 is disposed in a compressed state between the molded-article-pressing plate 22 and an end-surface portion 7e of the output shaft 7a that is exposed to the central opening section in the boss 3d of the externally toothed gear 3.

Next, the first guide plate 15 of the powder supply mechanism 10 is attached to the plug inner-side end surface 4d of the wave generator 4 inside the inner-side space 9 in a state of surrounding the friction plate 13 and the press-molded article 12. The first guide plate 15 is provided with an inverted-frustum-shaped tube portion 15a expanding along the direction of the axis 1a from the lower side toward the upper side, and a discoid portion 15b extending radially inward from the upper end of the tube portion 15a. An inner-peripheral-side portion of the discoid portion 15b is coaxially secured to the plug inner-side end surface 4d. Opening sections 15c are formed, at equiangular intervals along the circumferential direction, in an outer peripheral edge portion of the discoid portion 15b that is linked to the upper end of the tube portion 15a.

Additionally, the second guide plate 16 is coaxially secured to a plug outer-side end surface 4e of the wave plug 4a, the plug outer-side end surface 4e being located on the side opposite from the inner-side space 9. The second guide plate 16 is formed in a discoid shape, and the outer peripheral edge of the second guide plate 16 extends to the vicinity of an outer race in the wave bearing 4b of the wave generator 4. An annular end-surface portion 5a reaching from the outer peripheral edge to the contact section A (toothed section) is formed on the device housing 5 at a position adjacent to the upper side of the second guide plate 16.

Figure 1B:
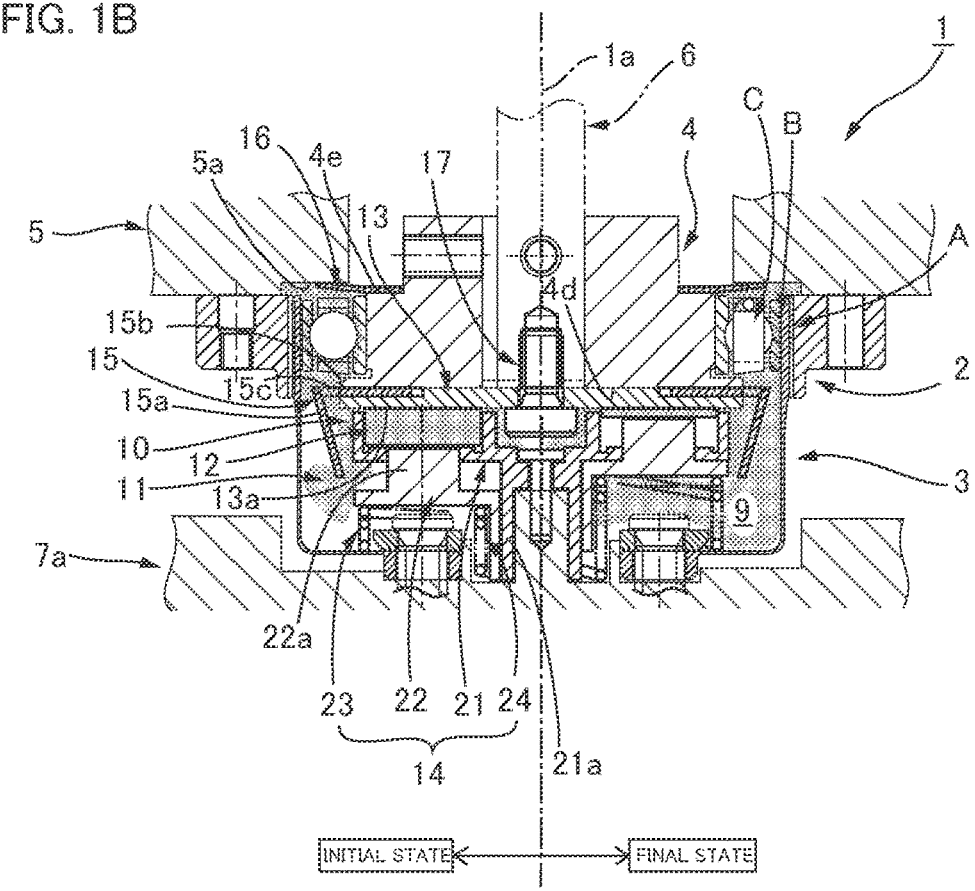
FIG. 1B is a schematic longitudinal cross-sectional diagram of the strain wave gearing in FIG. 1A, where the left side shows a half longitudinal cross-section in an initial state, and the right side shows a half longitudinal cross-section in a final state in which a press-molded article is worn and running low.

FIG. 1B is a schematic longitudinal cross-sectional diagram of the strain wave gearing, where the left side shows a half longitudinal cross-section in an initial state, and the right side shows a half longitudinal cross-section in a final state in which the press-molded article 12 is worn and running low. A description shall now be given with reference to FIG. 1B. While the strain wave gearing 1 is operating, the friction plate 13 rotates at high speed integrally with the wave plug 4a of the wave generator 4. The press-molded article 12 retained by the molded-article-pressing part 14 attached to the output-shaft 7a side rotates at a reduced speed integrally with the output shaft 7a. As a result, the press-molded article 12 enters a state of frictional contact of being pressed against the friction surface 13a of the friction plate 13 by spring force, and is worn by the friction surface 13a, whereby the solid lubricant abrasion powder 11 is produced.

The solid lubricant abrasion powder 11 produced from the press-molded article 12 is guided to the upper-end side of the tube portion 15a by the inverted-frustum-shaped tube portion 15a and the discoid portion 15b of the first guide plate 15, and moreover is guided in a direction toward the contact sections B, C through the opening section 15c. Additionally, the solid lubricant abrasion powder 11 flung toward the outer-peripheral side from the lower end of the tube portion 15a is guided in a direction toward the contact sections B, C along a frustum-shaped outer peripheral surface portion of the inverted-frustum-shaped tube portion 15a rotating at high speed.

The solid lubricant abrasion powder 11 is supplied to the internal contact section B (wave generator bearing 4b) and the contact section C (contact section between the wave generator 4 and the externally toothed gear 3), whereby these portions are lubricated. Furthermore, some of the solid lubricant abrasion powder 11 supplied to the wave generator bearing 4b passes through a raceway section of the wave generator bearing 4b and moves to the upper side. Additionally, some of the solid lubricant abrasion powder 11 supplied between the wave generator 4 and the externally toothed gear 3 passes through between these elements and moves to the upper side.

The second guide plate 16, which rotates at high speed integrally with the wave generator 4, is disposed above the wave generator bearing 4b. After having passed through to the upper side, the solid lubricant abrasion powder 11 is guided to the outer-peripheral side by the second guide plate 16 rotating at high speed and is supplied to the contact section A (tooth land section of the external teeth and the internal teeth).

As shall be apparent upon comparing the left-side half longitudinal cross-section and the right-side half longitudinal cross-section in FIG. 1B, the press-molded article 12 is worn by frictional contact with the friction plate 13 and gradually decreases in thickness. Because the press-molded article 12 is constantly pressed against the friction surface 13a of the friction plate 13 due to spring force, a fixed amount of the solid lubricant abrasion powder 11 is continuously produced. Thus, the solid lubricant abrasion powder 11 is continuously and incrementally supplied in substantially fixed amounts to the contact sections B, C to be lubricated.

It is possible to use molybdenum disulfide ($MoS_2$), tungsten disulfide ($WS_2$), graphite, carbon nanotubes (CNT), onion-like carbon (OLC), etc., as the solid lubricant powder used in order to mold the press-molded article 12.

It is desirable for the press-molded article 12 to be cylindrical or annular, which are simple forms. Light press-molding is preferred, and a compacting density of no more than 50% of the true density is desired. The true density is 4.8 in the case of $MoS_2$, 7.5 in the case of $WS_2$, 2.2 in the case of graphite, and 1.74 in the case of OLC.

It is possible to use steel, stainless steel, a copper alloy, an aluminum alloy, or a ceramic as the material of the friction plate 13, provided that this material has a hardness of Hv 60 (a Mohs hardness of 2) or greater. It is desirable for the friction plate 13 to be composed of a material to which the solid lubricant abrasion powder being used does not readily adhere. The materials steel, stainless steel, copper alloys, aluminum alloys, and ceramics are listed in order of increasing difficulty of adhesion. It is desirable for the surface roughness of the friction surface 13a to be 12S or less (S: Local summit mean interval, μm), and the friction surface 13a may be finely shaped through surface texturing.

Pressing force for pressing the press-molded article 12 against the friction plate 13 is produced by the pair of helical springs 23, 24 in the present example. Springs of a variety of shapes can be used as pressing mechanisms for generating fixed pressing force. For example, helical springs, Belleville springs, volute springs, etc., can be used; helical compression springs for which the spring constant can be freely designed are easy to handle. Numerous spring members can be used together.

As described above, wearing down the press-molded article 12 while the strain wave gearing 1 is operating causes very small amounts of the solid lubricant abrasion powder 11 to be stably and incrementally produced over an extended period and makes it possible to supply the solid lubricant abrasion powder 11 to sites to be lubricated. It is possible to suppress any reduction in efficiency caused by loss torque produced due to a large amount of the solid lubricant powder being supplied into gaps between contact surfaces to be lubricated, particularly into contact sections of the wave generator 4 rotating at high speed. Thus, it is possible to extend the service life of the strain wave gearing 1 while keeping the efficiency consistently high.

Embodiment 2

In the powder supply mechanism 10 of the strain wave gearing 1 in embodiment 1 described above, the press-molded article 12 is attached to the output shaft 7a (externally toothed gear 3), which rotates at a reduced speed, and the friction plate 13 is attached to the wave plug 4a of the wave generator 4, which rotates at high speed. However, in lieu of the powder supply mechanism 10, it is possible to use a powder supply mechanism configured such that the press-molded article 12 is attached to the wave plug 4a rotating at high speed and the friction plate 13 is attached to the output shaft 7a (externally toothed gear 3) rotating at a reduced speed.

Figure 2A:
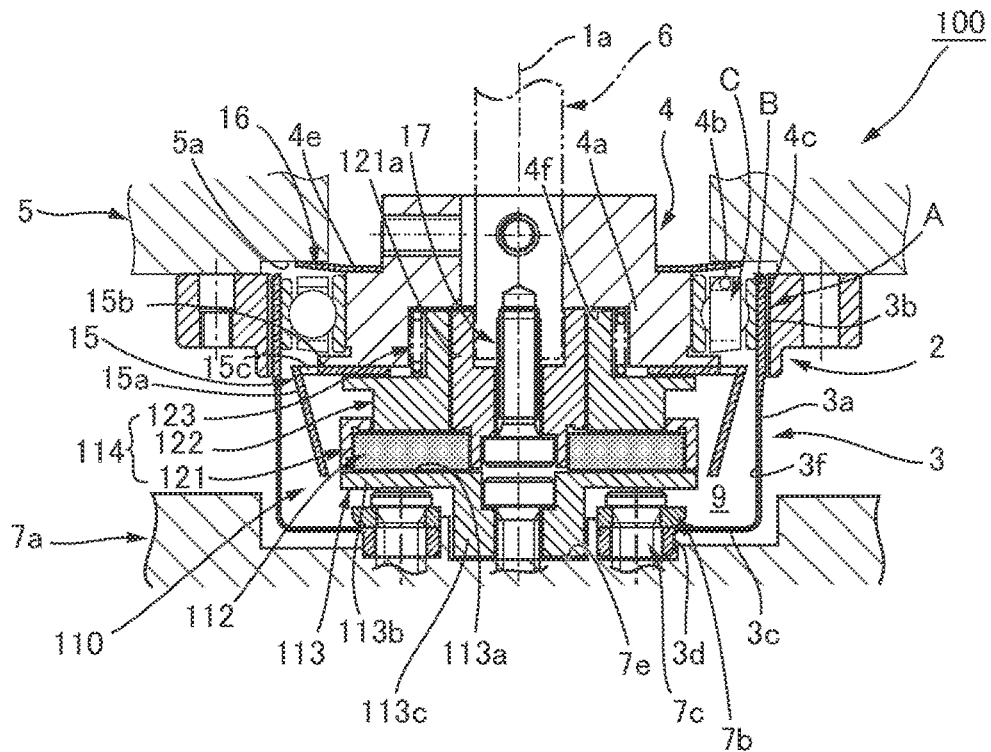
FIG. 2A is a schematic longitudinal cross-sectional diagram showing another example of a strain wave gearing to which the present invention is applied.

FIG. 2A is a schematic longitudinal cross-sectional diagram showing a strain wave gearing in which a powder supply mechanism having this configuration is incorporated. Because the basic configuration of the strain wave gearing 100 is identical to that of the strain wave gearing 1, the same reference symbols are associated with corresponding components, and no description is given therefor.

A powder supply mechanism 110 is provided with a press-molded article 112 of a solid lubricant powder, a friction plate 113 that comes into frictional contact with the press-molded article 112 to produce a solid lubricant abrasion powder 111, and a molded-article-pressing part 114 for pressing the press-molded article 112 and the friction plate 113 relatively against each other and maintaining the state in which these two elements are in frictional contact. The powder supply mechanism 110 is also provided with a first guide plate 15 for agitating the solid lubricant abrasion powder 111 produced from the press-molded article 112 and guiding the solid lubricant abrasion powder 111 toward contact sections B, C at the sites to be lubricated, and a second guide plate 16 for guiding the solid lubricant abrasion powder 111 that passes through the contact sections B, C toward a contact section A.

The discoid friction plate 113 is attached to an output shaft 7a secured to an externally toothed gear 3. The friction plate 113 is provided with a disc portion 113b disposed in an inner-side space 9, and an attachment shaft part 113c that protrudes from the central portion of the disc portion 113b toward the side opposite from the inner-side space 9. The attachment shaft part 113c is coaxially secured to the output shaft 7a through a central opening section in a boss 3d of the externally toothed gear 3. An end surface of the disc portion 113b that faces the inner-side space 9 is formed as a friction surface 113a. The friction plate 113 rotates at a reduced speed integrally with the output shaft 7a (externally toothed gear 3).

The molded-article-pressing part 114 is provided with a molded-article-retaining member 121 for retaining the press-molded article 112 in a state enabling movement in directions toward and away from the friction surface 113a, a molded-article-pressing plate 122 for pressing the press-molded article 112 retained by the molded-article-retaining member 121 against the friction surface 113a, and a helical spring 123 for pressing the press-molded article 112 against the friction surface 113a via the molded-article-pressing plate 122.

The molded-article-retaining member 121 is coaxially secured to an input shaft 6, which is secured to a wave plug 4a of a wave generator 4 in the inner-side space 9. The molded-article-pressing plate 122 is disposed above the molded-article-retaining member 121 and is provided with an annular protrusion 122a for pressing the press-molded article 112 retained by the molded-article-retaining member 121 against the friction surface 113a. Additionally, the molded-article-pressing plate 122 is supported, by a pressing-plate guide shaft 121a formed in a central section of the molded-article-retaining member 121, in a state enabling sliding in the direction of an axis. The slidable moldedarticle-pressing plate 122 is pressed toward the friction surface 113a by the helical spring 123. The helical spring 123 is disposed in a compressed state between the molded-article-pressing plate 122 and a central inner-side end surface 4f of the wave plug 4a.

Figure 2B:
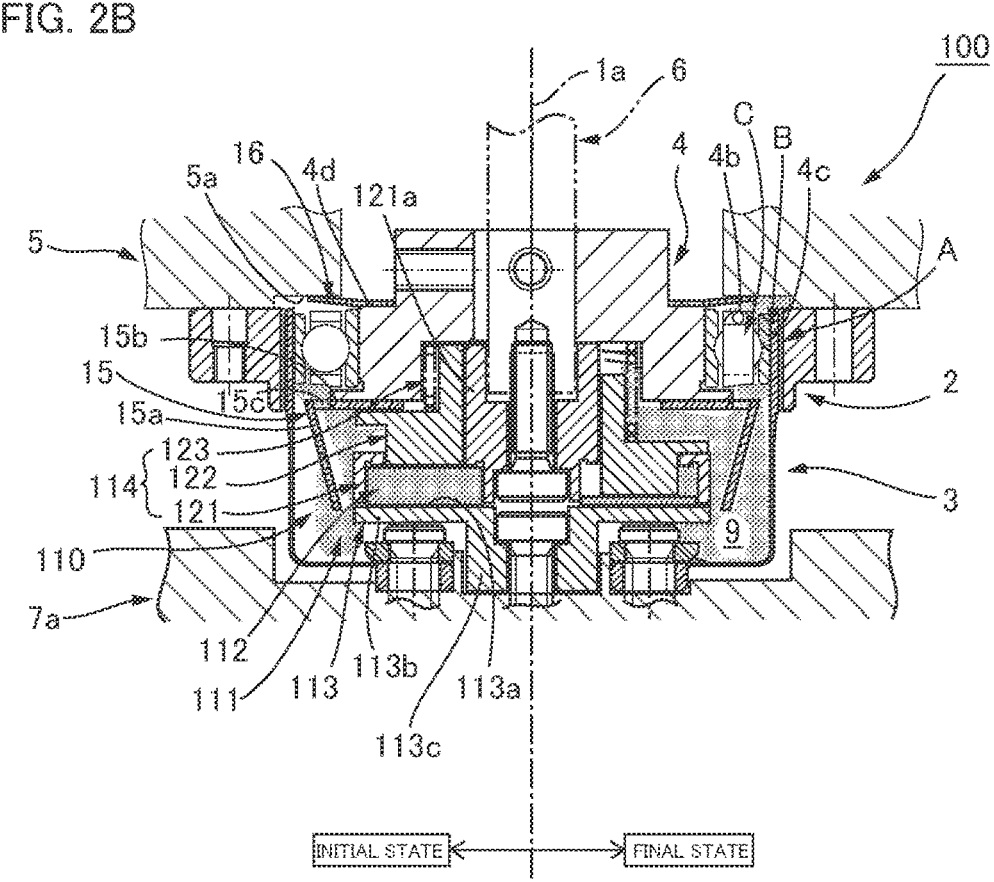
FIG. 2B is a schematic longitudinal cross-sectional diagram of the strain wave gearing in FIG. 2A, where the left side shows a half longitudinal cross-section in an initial state, and the right side shows a half longitudinal cross-section in a final state in which a press-molded article is worn and running low.

FIG. 2B is a schematic longitudinal cross-sectional diagram of the strain wave gearing, where the left side shows a half longitudinal cross-section in an initial state, and the right side shows a half longitudinal cross-section in a final state in which the press-molded article 112 is worn and running low. A description shall now be given with reference to FIG. 2B. While the strain wave gearing 100 is operating, the friction plate 113 rotates at a reduced speed integrally with the output shaft 7a (externally toothed gear 3). The press-molded article 112 retained by the molded-article-pressing part 114 attached to the wave-plug 4a (input-shaft 6) side of the wave generator 4 rotates at high speed integrally with the wave plug 4a. The press-molded article 112 enters a state of frictional contact of being pressed against the friction surface 113a of the friction plate 113 by spring force, and is worn by the friction surface 113a, whereby the solid lubricant abrasion powder 111 is produced.

The solid lubricant abrasion powder 111 produced from the press-molded article 112 is guided to the upper-end side of the tube portion 15a by an inverted-frustum-shaped tube portion 15a and a discoid portion 15b of the first guide plate 15, and moreover is guided in a direction toward the contact sections B, C through an opening section 15c. Additionally, the solid lubricant abrasion powder 111 flung toward the outer-peripheral side from the lower end of the tube portion 15a is guided in a direction toward the contact sections B, C along a frustum-shaped outer peripheral surface portion of the inverted-frustum-shaped tube portion 15a rotating at high speed.

The solid lubricant abrasion powder 111 is supplied to the internal contact section B (wave generator bearing 4b) and the contact section C (contact section between the wave generator 4 and the externally toothed gear 3), and these portions are lubricated. Furthermore, some of the solid lubricant abrasion powder 111 supplied to the wave generator bearing 4b passes through a raceway section of the wave generator bearing 4b and moves to the upper side. Additionally, some of the solid lubricant abrasion powder 111 supplied between the wave generator 4 and the externally toothed gear 3 passes through between these elements and moves to the upper side.

The second guide plate 16, which rotates at high speed integrally with the wave generator 4, is disposed above the wave generator bearing 4b. After having passed through to the upper side, the solid lubricant abrasion powder 111 is guided to the outer-peripheral side by the second guide plate 16 rotating at high speed and is supplied to the contact section A (tooth land section of external teeth and internal teeth).

As shall be apparent upon comparing the left-side half longitudinal cross-section and the right-side half longitudinal cross-section in FIG. 2B, the press-molded article 112 is worn by frictional contact with the friction plate 113 and gradually decreases in thickness. Because the press-molded article 112 is constantly pressed against the friction surface 113a of the friction plate 113 due to spring force, a fixed amount of the solid lubricant abrasion powder 111 is continuously produced. Thus, the solid lubricant abrasion powder 111 is continuously and incrementally supplied in substantially fixed amounts to the contact sections B, C, A to be lubricated.

The invention claimed is:

1. A powder lubrication method of a strain wave gearing, comprising:
   disposing a press-molded article of a solid lubricant powder inside a strain wave gearing;
   making a friction plate to bring into frictional contact with the press-molded article to produce a solid lubricant abrasion powder while the strain wave gearing is operating; and
   using the produced solid lubricant abrasion powder to lubricate sites to be lubricated in the strain wave gearing.

2. The powder lubrication method of a strain wave gearing according to claim 1, wherein
   the solid lubricant powder is at least one from among molybdenum disulfide, tungsten disulfide, graphite, carbon nanotubes, and onion-like carbon.

3. The powder lubrication method of a strain wave gearing according to claim 1, wherein
   the press-molded article is a lightly press-molded article having a compacting density of equal to or less than 50% of the true density.

4. The powder lubrication method of a strain wave gearing according to claim 1, wherein:
   the material of the friction plate is steel, stainless steel, a copper alloy, an aluminum alloy, or a ceramic, said material having a hardness of Hv 60 or greater, or a Mohs hardness of 2 or greater; and
   the surface roughness of a friction surface of the friction plate is equal to or less than 12S.

5. The powder lubrication method of a strain wave gearing according to claim 1, wherein:
   the strain wave gearing is provided with a rigid internally toothed gear, a flexible externally toothed gear disposed inside the internally toothed gear, and a wave generator disposed inside the externally toothed gear;
   the wave generator is a rotation-inputting member, and the externally toothed gear is a secured member or a rotation-outputting member;
   the friction plate is attached to one element from among the wave generator and the externally toothed gear, and the press-molded article is attached to the other of these elements; and
   at least one component from among the friction plate and the press-molded article is pressed against the other of these components using a spring member, whereby a state of frictional contact between these elements is maintained.

6. A strain wave gearing comprising:
   a rigid internally toothed gear,
   a flexible externally toothed gear disposed inside the internally toothed gear,
   a wave generator disposed inside the externally toothed gear, and
   a powder supply mechanism disposed inside the externally toothed gear,
   the powder supply mechanism being provided with
   a press-molded article of a solid lubricant powder,
   a friction plate that comes into frictional contact with the press-molded article to produce a solid lubricant abrasion powder, and
   a spring member for pressing the friction plate against the press-molded article and maintaining the state in which these two elements are in frictional contact.

7. The strain wave gearing according to claim 6, wherein the solid lubricant powder is at least one from among molybdenum disulfide, tungsten disulfide, graphite, carbon nanotubes, and onion-like carbon.

8. The strain wave gearing according to claim 6, wherein:
the wave generator is a rotation-inputting member, and the externally toothed gear is a secured member or a rotation-outputting member;
the friction plate is disposed on one element from among the wave generator and the externally toothed gear, and the press-molded article is disposed on the other of these elements; and
at least one component from among the friction plate and the press-molded article is pressed against the other of these components using the spring member.

9. The strain wave gearing according to claim 6, wherein the press-molded article is a lightly press-molded article having a compacting density of no more than 50% of the true density.

10. The strain wave gearing according to claim 6, wherein the press-molded article is cylindrical or annular.

11. The strain wave gearing according to claim 6, wherein:
the material of the friction plate is steel, stainless steel, a copper alloy, an aluminum alloy, or a ceramic, said material having a hardness of Hv 60 or greater, or a Mohs hardness of 2 or greater; and
the surface roughness of a friction surface of the friction plate is 12S or less.

\* \* \* \* \*